United States Patent [19]

Linden et al.

[11] Patent Number: 5,350,798
[45] Date of Patent: Sep. 27, 1994

[54] ABSORBABLE TISSUE ADHESIVES

[75] Inventors: Charles L. Linden, Bethesda, Md.; Shalaby W. Shalaby, Anderson, S.C.

[73] Assignee: The United States of America as represented by the Secretary of the Army, Washington, D.C.

[21] Appl. No.: 106,941

[22] Filed: Aug. 17, 1993

[51] Int. Cl.$^5$ ............................................. C08L 67/02
[52] U.S. Cl. .................................... 525/41; 525/42; 525/937
[58] Field of Search ........................... 525/42, 41, 937

[56]  References Cited

U.S. PATENT DOCUMENTS

| | | | |
|---|---|---|---|
| 3,223,083 | 12/1965 | Cobey | 128/92 |
| 3,264,249 | 8/1966 | Araki | 528/118 |
| 3,559,652 | 2/1971 | Banitt | 128/334 |
| 4,140,678 | 2/1979 | Shalaby | 528/272 |

Primary Examiner—Patricia A. Short
Attorney, Agent, or Firm—Werten F. W. Bellamy; John Francis Moran

[57] ABSTRACT

Tissue adhesive compositions are disclosed which comprise at least one 2-cyanoacrylate ester of the general formula (I)

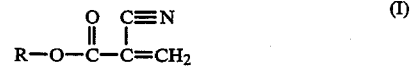

in admixture with from about 2 percent to about 25 percent of at least one oxalic acid polymer of the general formula (II)

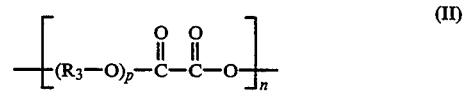

8 Claims, No Drawings

ABSORBABLE TISSUE ADHESIVES

FIELD OF THE INVENTION

This invention relates to improvements in the surgical repair of mammalian body tissues. More particularly the invention relates to improved surgical repair systems comprising fast-polymerizing 2-cyanoacrylate monomers modified by the addition of certain polymeric oxalates.

BACKGROUND OF THE INVENTION

For many years surgical tissue closure has been accomplished by a variety of fundamental techniques such as the use of clamps, staples or a variety of sutures. Disadvantages associated with use of those techniques has led to the development of new techniques for joining damaged mammalian tissues and reducing or preventing the loss of blood or other bodily fluids as well.

One approach has been the development of tissue adhesives for joining tissues, derived from either natural or synthetic products. Adhesive bonding with natural products such as fibrin or glues derived from mollusks such as mussels and barnacles has shown promise. Fibrin glue has been prepared by reacting a cryoprecipitate of fibrinogen and thrombin in the presence of calcium ion to produce fibrin monomer. This monomer reacts in the presence of a factor found in the patient's blood (Factor XIII) to form a polymer. These fibrin glues have found use in topical and spray applications as a hemostatic agent on bleeding anastomoses, bleed points caused by needle holes or suture lines, and on the heart surface to control bleeding. The fibrin glues have only a modest tensile strength and therefore have not found significant use for repairing tissues which are subjected to load.

Barnacle glue has shown promise since its polymerization is rapid and occurs under conditions which are similar to the environment in which they would be used. It also maintains its adhesive properties under adverse chemical conditions. However under typical use conditions the resulting adhesive joint has unacceptable tensile strength. Preparation of glues from mollusks is difficult however, and large quantities of material must be processed to obtain a significant amount of adhesive. To prepare 1 milligram of adhesive from barnacles requires the harvest and treatment of at least 150 barnacles.

For these reasons a great deal of attention has been given to the development of synthetic adhesive systems. Especially prominent has been the development of adhesive and hemostasis-inducing compositions comprising fast curing monomers such as dialkyl methylene malonates (U.S. Pat. No. 3,221,745) and monomeric lower alkyl 2-cyanoacrylates (U.S. Pat. Nos. 3,223,083 and 3,264,249). Because the lower alkyl 2-cyanoacrylates did not appear to combine the desired, if not necessary, properties of low toxicity and adequate adsorption by tissues, the use of alkoxyalkyl 2-cyanoacrylates was developed (U.S. Pat. No. 3,559,652). Other polymers presently under investigation include polyurethanes and epoxy resins. The latter two polymer systems suffer disadvantages of limited "pot life" or "open time", have significant exotherms when polymerized and exhibit toxicity to surrounding tissues.

It is advantageous for tissue adhesives to able to be absorbed or degraded in the body, otherwise known as bioabsorption or biodegradation. Among the advantages are that it has been shown that long-term implants of nondegradable films and disks in rodents will induce neoplasms, and although there are no studies to show this will occur in primates, it is a matter for concern. Second, it is obviously more desirable that a device used in vivo should only remain as long as necessary to ensure proper healing. This should reduce or prevent adverse tissue reactions and/or foreign body responses. In orthopedic applications absorbable pins and plates that could perform in place of metal implants would require only a single surgical procedure. Absorbable polymers would also be useful for use with implantable systems for long-term drug delivery. The absorption ability of current materials ranges from the least degradable materials such as ceramics and carbon fibers through metallic alloys to the most degradable, organic polymers having reactive chains.

Shalaby in *Encyclopedia of Pharmaceutical Technology*, Swarbrick and Boylan, eds., Marcel Dekker Inc., New York, 1988, pp. 465-476 has classified bioabsorbable polymers into three groups; soluble, solublizable and depolymerizable. Soluble polymers are water-soluble and have hydrogen-bonding polar groups, the solubility being determined by the type and frequency of the polar group(s). Solublizable polymers are usually insoluble salts such as calcium or magnesium salts of carboxylic or sulfonic acid-functional materials which can dissolve by cation exchange with monovalent metal salts. Depolymerizable systems have chains that dissociate to simple organic compounds in vivo under the influence of enzymes or chemical catalysis.

The response of tissues to biodegradable materials is dependent on the rate of absorption, but more importantly it is regulated by the toxicity of the degradation products. Thus it is important to have controlled absorption to decrease the toxicity and reaction of surrounding tissue to products that do elicit a response. It also is important to ensure that the mechanical properties of the polymer are maintained for sufficient time to allow proper healing. Thus absorbable polymeric adhesives and the products of their bioabsorption must be compatible with the surrounding tissues.

2-cyanoacrylates bond rapidly and form strong adhesive joints. Their properties may be modified easily by modification of their substituent groups. They are well-suited for biological applications since, unlike other adhesives such as epoxy resins and polyurethanes, 2-cyanoacrylates may be used as pure monofunctional monomers having well-defined properties. They homopolymerize rapidly at room temperature in the presence of weakly basic moieties such as water and other weakly basic species present in bodily fluids. Since their introduction in 1958 they have found use in many surgical applications such as hemostasis, as sealants, for retrofilling and as general tissue adhesives. A 2-cyanoacrylate suitable for use as a tissue adhesive should be non-toxic and biodegradable, should wet and spread on tissue substrates and polymerize quickly to a thin polymeric film. The polymeric adhesive should have a degree of flexibility, especially when bonding soft tissues. Biodegradability is especially important because the adhesive should be replaced by the body's tissues and not slow or bar complete healing.

In the homologous series of poly(alkyl 2-cyanoacrylates) the lower homologs such as the methyl ester exhibit the highest rate of bioabsorption but also elicit the greatest tissue response. They also do not wet, spread or polymerize on biological substrates as rapidly as the higher homologs. On the other hand, the higher alkyl esters such as the isobutyl ester elicit minimal tissue reaction but degrade slowly if at all. Therefore the main drawbacks for use of the alkyl 2-cyanoacrylates has been their histotoxicity and/or lack of biodegradability. Despite those deficiencies, the n-butyl and isobutyl and other higher esters have been found acceptable as tissue adhesives. In an effort to combine the higher biodegradability of the lower alkyl esters with the lower toxicity of the higher esters Banitt and Nelson (U.S. Pat. No. 3,559,652) developed alkoxyalkyl 2-cyanoacrylate adhesives which were stated to be bioabsorbable and to exhibit minimal toxicity and inflammation. Kronenthal and Schipper (U.S. Pat. No. 3,995,641) developed a carboxyalkyl 2-cyanoacrylate which was stated to be useful as an adhesive or a wound dressing.

Other problems which have been observed with alkyl 2-cyanoacrylate adhesives are their low monomer viscosities and the formation of a high modulus crust on soft tissues. Due to their low molecular weight and rapid polymerization times 2-cyanoacrylates may be formulated with biologically acceptable modifiers. Because the monomer initiates with any anionic or free radical source, formulations with modifiers are not easily made. Control of the viscosity of the monomeric adhesive may be obtained by adding a biologically acceptable thickening agent. Millet has reported that polylactic acid is an effective thickening agent (*Structural Adhesives: Chemistry and Technology*, S.R. Hartshorn ed., Plenum Press, New York, 1986, pp.249–303)

Plasticizers are commonly used to decrease the brittleness of polymers. Plasticizers function by lowering the glass transition temperature and the modulus of the polymer. Plasticizers may be internal or external. Internal plasticization is accomplished by using mixtures of compatible monomers to form a copolymer having segments of varying hardness. External plasticization may be obtained by the addition of esters such as cyanoacetates, malonates, adipates, sebacates and the like (Millet, op. cit.).

Therefore it is clear that there is a need for tissue adhesives which have been modified by plasticizers/modifiers which exhibit biodegradability, an acceptable histotoxicity and reasonably match the modulus of the tissues being joined by the adhesive.

SUMMARY OF THE INVENTION 2-cyanoacrylate-based tissue adhesives have been developed which employ biocompatible oxalate polymers as reactive plasticizers and thickening agents. The adhesives are capable of being formulated to allow modulus matching of the adhesive and the substrate.

DETAILED DESCRIPTION OF THE INVENTION

The 2-cyanoacrylate-based tissue adhesive systems of the present invention comprise at least one 2-cyanoacrylate ester of the general formula (I)

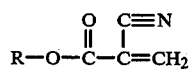

(I)

wherein R is selected from the group consisting of alkyl groups having from 1 to about 8 carbon atoms and, preferably, alkoxyalkyl groups having the formula $R_1-O-R_2-$ wherein $R_1$ is an alkyl group having from 1 to about 8, preferably 1 to 3 carbon atoms and $R_2$ is an alkylene group having from 3 to about 6, preferably 3 or 4 carbon atoms, in admixture with from about 2 percent to about 25 percent, preferably about 5 to 10 percent, of at least one oxalic acid polymer of the general formula (II)

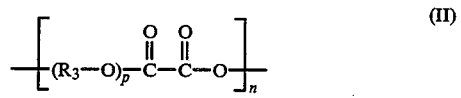

(II)

wherein each $R_3$ is an alkylene group having from 2 to about 4 carbon atoms, each p is an integer from 1 to about 4, with the proviso that not more than about 1 of each 20 p's is 1, and n is the degree of polymerization which results in a polymer which does not initiate polymerization upon mixing with the 2-cyanoacrylate monomer and standing for about 12 hours. Suitable alkylene groups include but are not limited to ethylene, propylene, trimethylene, butylene, isobutylene, and tetramethylene. It is preferred that p have a value of 3 and $R_3$ is ethylene. Where p is 1 it is preferred that $R_3$ is trimethylene.

General methods for the preparation of polyalkylene oxalates have been described by Shalaby and Jamiolkowski (U.S. Pat. No. 4,140,678). A two step process is used in which first a monomeric oxalic acid ester such as diethyl oxalate is transesterified with an alkylene glycol by heating in an inert atmosphere in the presence of a catalyst such as stannous octanoate and removing and collecting the ethanol as it is formed. When the calculated amount of ethanol has been recovered the mixture is then heated under reduced pressure to increase the molecular weight of the polymer. The progress of the reaction may be followed by observing the infrared hydroxyl peak at 3200–3600 cm$^{-1}$.

It has been found that the poly(alkylene oxalates) of U.S. Pat. No. 4,140,678 are not compatible with methoxypropyl 2-cyanoacrylate, a preferred 2-cyanoacrylate of the class of monomers disclosed in U.S. Pat. No. 3,559,652, even after intensive mixing (sonication) for 24 hours. A more polar oxalate polymer prepared from triethylene glycol, a polyoxyalkylene glycol, was found to be completely miscible with the cyanoacrylate monomer. It has been found advantageous to include in the reaction mixture a small amount (about 5 mol %) of a low molecular weight, and thus more volatile, glycol such as trimethylene glycol, which can be stripped more easily from the reaction mixture to advance the molecular weight in the second step of the polycondensation reaction. The infra-red spectra of polymers prepared in this manner did not show evidence that any significant amount of the glycol was incorporated into the polymer.

Since the polymer-modified 2-cyanoacrylate compositions of the invention may polymerize upon heating, to prepare sterile compositions for clinical use the individual components should be prepared under sterile conditions and then mixed under sterile conditions and then placed in sealed microbially impervious containers made of materials such as polyethylene, polypropylene and the like which will not initiate premature polymerization of the composition.

EXPERIMENTAL

Care must be taken at all times to avoid contacting 2-cyanoacrylate-containing materials come with glass, metals, or water, since polymerization will occur immediately on such contact. All cyanoacrylates were stored in inert containers under nitrogen at 7° C.

Preparation and Testing of Oxalate Esters

Poly(hexamethylene oxalate) and poly(trimethylene oxalate) were prepared according to the method of U.S. Pat. No. 4,140,678. Samples of each were placed in sterile 15 ml polypropylene centrifuge tubes with sufficient methoxypropyl 2-cyanoacrylate to form a 10% wt/vol solution and sealed. After approximately 5 minutes mixing the sealed tube was sonicated overnight in a water bath. No dissolution or mixing of the cyanoacrylate monomer with the respective polymers was seen.

EXAMPLE 1

Preparation and Testing of Poly[tri(oxyethylene) oxalate]

A mixture of 26 g (0.20 mol) diethyl oxalate, 31 g (0.23 mol) triethylene glycol, 0.9 g (0.012 mole) 1,3-propane diol and 0.0002 mol stannous octanoate as a 0.33M solution in toluene was placed in a flame-dried polymerization flask equipped with a stirrer and a distillation head and collection apparatus. All reactants were distilled or dried in a conventional manner before use. The flask was heated at 150° C. for 0.3 hour, then 120° C. for 2 hours and then 150° C. for four hours, at which time the theoretical amount of ethanol had been removed. The flask then was subjected to a vacuum of less than 0.1 mm Hg and heated to 150° C. for one hour, then 160° C. for three hours, 180° C. for one hour and finally 200° C. for five hours. The progress of the reaction was monitored by periodically removing a small sample of the reaction mixture and observing the hydroxyl absorption peak at 3200–3600 cm$^{-1}$ of the liquid polymer spread on a KBr plate. At the end of that time the reaction mixture was allowed to cool and the liquid polymer was stored in vacuum storage containers at a pressure below 0.1 mm Hg. On long standing the polymer partially crystallized to a low-melting (about 28° C. as determined by DSC at 10° C./min heating rate of a liquid nitrogen quenched sample) solid which reliquified readily under ambient conditions. The viscosity of an 0.1% wt/vol solution in chloroform in an Ostwald viscometer at 31° C. was used to determine the inherent viscosity $\eta_{inh}$0.059 (Preparation A).

The compatibility of the polymer with methoxypropyl 2-cyanoacrylate was tested in the same manner as the poly(alkylene oxalates) above. Complete miscibility was observed. In some preparations the molecular weight was not advanced sufficiently and polymerization of the cyanoacrylate occurred on standing. Heating such polymers for an additional period under vacuum to increase the molecular weight decreased the hydroxyl content sufficiently that polymerization no longer occurred when a sample was mixed with monomer in an dry, inert container. One such preparation yielded polymer having an inherent viscosity $\eta_{inh}$0.225 (Preparation B).

EXAMPLE 2

In Vitro Evaluation of Absorption of Modified Cyanoacrylates

Samples of pure methoxypropyl 2-cyanoacrylate (MPC) and poly[tri(oxyethylene) oxalate] modifier (TOEO) (Example 1, Preparation A) were mixed at 5% and 10% wt/vol modifier/cyanoacrylate. 10 μl aliquots of modified cyanoacrylate and of pure cyanoacrylate were polymerized in small polyethylene coagulation cups filled in the presence of a 0.5% aqueous solution of sodium bicarbonate. The samples were allowed to polymerize for at least five minutes and then were transferred to a large basin filled with the bicarbonate solution. The samples kept in the bath for an additional 30 minutes to ensure complete polymerization. They were then removed and rinsed with distilled water, blotted dry on lint-free absorbent paper and place in a vacuum desiccator. The samples were from 5 to 8 mm in diameter.

In vitro absorption was studied by measuring weight loss of samples in a synthetic medium at 5, 15, 25, 50, 75, 100 and 125 days. Test sets of five samples of each composition for each test interval were prepared in the following manner. A phosphate buffer was prepared using 4.54 g potassium hydrogen phosphate and 14.21 g sodium dihydrogen phosphate in 2,000 ml distilled water. Preweighed 50 ml polypropylene centrifuge tubes were filled with 50 ml of buffer and a weighed sample of the modified polymer or homopolymer was placed in each tube. The tubes were placed in a 37° C. water bath and agitated for the entire test period.

After each period of time all samples for that period were evaluated to determine if they had fragmented. For samples which had not fragmented the buffer solution was removed and reduced to about 3 ml. The sample was rinsed with about 50 ml of ultrapure water. The rinse water was decanted until about 3 ml remained and the tube was placed in a vacuum desiccator until the weight of the tube plus sample became constant. The sample was then removed and the tube was rinsed to remove any sample fragments and the tube was then dried in the same manner. The weight of sample was then determined by the difference between the weight of tube plus sample and the weight of the tube. If any one of a set of samples showed particulate matter all of the set was treated by a modified procedure, centrifuging at 1,000 rpm for five minutes before decanting the buffer and after rinsing to ensure capture of all particulate matter. The analysis showed that there was a statistically significant difference between the absorbability of the samples containing 5% modifier and those containing 10%. None of the samples fragmented or broke up into small pieces, many had the same outward appearance as at the beginning of the run. This phenomenon is not unusual, and has been discussed by Kronenthal (*Polymer Science and Technology*, pp.113–133, Plenum Press, New York 1975). Electron Dispersive Analysis (EDAX) was carried out to be certain that buffer residues did not contribute to the sample weights. Only trace amounts of contaminating species were observed.

The data were treated statistically using the General Linear Models Procedure of SAS Institute and are presented in Table 1.

TABLE 1

| | Days | | | | | | |
|---|---|---|---|---|---|---|---|
| | 5 | 15 | 25 | 50 | 75 | 100 | 150 |
| % loss MPC | — | — | 5.77 | 12.26 | 12.14 | 7.82 | 8.97 |
| % loss 5% TOEO | 13.36 | 35.74 | 51.12 | 74.53 | 87.34 | 93.15 | 94.83 |
| % loss 10% TOEO | 24.85 | 32.40 | 47.84 | 45.24 | 57.87 | 53.02 | 56.07 |

The adhesive performance of isobutyl cyanoacrylate (IBC), methoxypropyl cyanoacrylate (MPC) and MPC containing 10% poly[(trioxyethylene) oxalate] (TOEO) from Example 1, Preparation B were compared in vitro using goat skin as the substrate.

After closely clipping the hair, skin was harvested from the sides of a goat carcass as three marked and measured 3" by 12" strips. The skin had been frozen for eleven days and was removed from the carcass on the twelfth day. The skin patches were pinned to pans which had been coated with paraffin to simplify pinning and covered with normal saline and stored in a refrigerator overnight. The following day the saline was drained and excess moisture blotted off with lint-free paper. A 28 mm incision was made down the middle of each patch along the long axis with a #10 scalpel, being certain not to sever the skin at either end of the cut. Taking care that the skin was in its original cut size, the cross-sectional areas of the incisions were determined by measuring across the cut site and multiplying by the width of each of the sample cuts (2.5 cm). The incision was dabbed with a gauze sponge to remove excess moisture and a 1 ml aliquot of the test adhesive was introduced along the incision line. The incision was quickly opposed using finger pressure to hold the sides together for about 30 seconds. The samples were allowed to polymerize for at least 3½hours. The IBC polymerized the most rapidly, the MPC more slowly, and the modified adhesive slightly more slowly than the MPC. The IBC formed a stiff crust at the incision site as has been reported in the literature, but neither the MPC nor the modified polymer appeared to do so. Then 2½cm strips were cut transversely to the incision line by first plunging the scalpel into the glued incision and then making a standard cut from that point to complete the sample. Samples were then tested on an Instron at a stroke rate of 0.6 in/sec, using a 500 lb load cell at 10% of full range. The results are shown below.

| | | |
|---|---|---|
| IBC 19 samples | 31.25 ± 5.99 psi | (95% conf. level) |
| MPC 18 samples | 33.47 ± 6.25 psi | " |
| 10% TOEO/MPC 19 samples | 43.86 ± 7.05 psi | " |

It is clear that the tensile strength of the adhesive made with the modified polymer is significantly greater than either of the homo polymers, which in turn showed no significant difference between one another.

Tests were also made joining bone, where MPC and the composition of the present invention were both observed to be less effective than IBC.

EXAMPLE 4

Cytotoxicity testing was performed on IBC, MPC and MPC containing 10% TOEO (Example 1, Preparation B) using a modification of ASTM F 895-84 "Standard Test Method for Agar Diffusion Cell Culture for Cytotoxicity". The actual test method was changed by placing 10 μl aliquots of MPC and 10% TOEO/MPC monomers directly on confluent monolayers of mouse fibroblasts from which most of the culture medium had been removed, rather than on an agar diffusion barrier. The negative control was medium and a monolayer to which no additive was introduced. The positive control was a copper penny placed directly on the center of the monolayer. The monomers were allowed to polymerize for at least one minute and then 2.0 ml of the culture medium was pipetted back into the 35 mm culture plate. The plates were incubated for at least 24 hours and then qualitatively evaluated. The results were taken from photographs taken at 200× magnification about 1 cm from the polymerized sample or penny, and the middle of the plate of the negative control. The negative control showed a crowded confluent monolayer. The positive control showed signs of total cellular lysis, only cellular debris being observed. The plates of the MPC and the 10% TOEO/MPC both appeared to have clumping of detached cells with little or no discernible lysis. The MPC plate appeared to have some cells that were just in the process of detaching. It is unclear whether the reaction observed was the result of fast-absorbing monomeric byproducts causing cellular detachment or was due to a toxic response associated with the high initial dose of monomeric adhesive which was used to ensure a response within a short time period.

We claim:

1. A composition of matter which comprises at least one 2-cyanoacrylate ester of the general formula (I)

wherein R is selected from the group consisting of alkyl groups having from 1 to about 8 carbon atoms and alkoxyalkyl groups having the formula $R_1—O—R_2—$ wherein $R_1$ is an alkyl group having from 1 to about 8 carbon atoms and $R_2$ is an alkylene group having from 3 to about 6 carbon atoms, in admixture with from about 2 percent to about 25 percent of at least one oxalic acid polymer of the general formula (II)

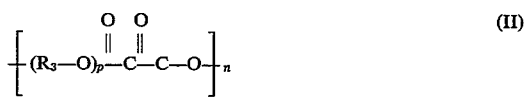

wherein each $R_3$ is an alkylene group having from 2 to about 4 carbon atoms, each p is an integer from 1 to about 4, with the proviso that not more than about 1 of each 20 p's is 1, and n is the degree of polymerization which results in a polymer which does not initiate polymerization upon mixing with the 2-cyanoacrylate monomer and standing for about 12 hours.

2. The composition of claim 1 wherein the 2-cyanoacrylate is 2-methoxypropyl 2-cyanoacrylate.

3. The composition of claim 1 wherein the oxalic acid polymer is a copolymer of oxalic acid with triethylene glycol and a minor amount of 1,3-propanediol.

4. A composition of matter which comprises 2-methoxypropyl 2-cyanoacrylate and a copolymer of oxalic acid with triethylene glycol.

5. The composition of claim 4 which further comprises a minor amount of 1,3-propanediol in the oxalate copolymer.

6. The cured composition of claim 1.

7. The cured composition of claim 4.

8. A sterile preparation which comprises the composition of claim 1.

* * * * *